Sept. 2, 1969  D. R. SULLIVAN  3,465,226
DC BRUSHLESS MOTOR
Filed June 21, 1967  2 Sheets-Sheet 1

INVENTOR:
DOUGLAS R. SULLIVAN

BY Joseph J. Alabohun Jr.
ATTORNEY

Sept. 2, 1969  D. R. SULLIVAN  3,465,226
DC BRUSHLESS MOTOR
Filed June 21, 1967  2 Sheets-Sheet 2

INVENTOR:
DOUGLAS R. SULLIVAN
BY
Joseph J. Alekshun Jr.
ATTORNEY

United States Patent Office 3,465,226
Patented Sept. 2, 1969

3,465,226
DC BRUSHLESS MOTOR
Douglas R. Sullivan, Weston, Mass., assignor to Massachusetts Institute of Technology, Cambridge, Mass., a corporation of Massachusetts
Filed June 21, 1967, Ser. No. 647,848
Int. Cl. H02k 29/02; H02p 3/08
U.S. Cl. 318—138                                    11 Claims

ABSTRACT OF THE DISCLOSURE

A DC brushless motor wherein the closed loop operation of a two-phase motor, resolver and drive system develops the misalignment between the field vectors in the motor necessary for torquing. The motor and resolver are mechanically coupled by a shaft. The output of the resolver, which is a function of the shaft angle, initiates the sampling of a pair of command signals in phase quadrature. The sampled values are coupled to the stator windings in the motor and develop a DC field vector that interacts with the rotor field vector to generate torque.

The invention herein described was made in the course of contracts with the office of the Secretary of Defense and the Ballistic Systems Division of the Air Force Systems Command.

BACKGROUND OF THE INVENTION

Field of invention

This invention relates generally to instrument grade motors and particularly to a brushless DC motor and a drive system therefor.

Description of the prior art

Because they feature comparatively high torquing efficiency and good control characteristics, DC motors are usually preferred over AC motors in instrumenting control systems. Most DC motors incorporate permanent stator magnets and generate torque through the interaction of the fields caused by the poles and those produced by the current in the rotor windings. A commutator acting in conjunction with brushes provides rotor current switching so as to produce a rotor field vector that is slightly misaligned with the field vector of the stator. This spatial misalignment between the two field vectors allows maximum torquing efficiency regardless of relative position between rotor and stator. It also permits the torque to be closely dependent on the rotor current and leads to precise control over the torque generated.

This continuous contact between the brushes and commutators of DC motors, however, causes wear and the release of both graphite particles from the brushes and metal particles from the commutator. These conductive particles are carried to other parts of the motor, increase friction and sometimes produce short circuits in the slip ring assembly. Equally significant, the wear itself eventually results in sloppiness in the motor assembly and adversely effects overall performance and accuracy.

SUMMARY OF INVENTION

In view of the foregoing features of DC instrument grade motors and limitations thereof due to brush-to-commutator wear, applicant has as the primray object of his invention to provide a DC motor requiring no brushes or commutator.

It is another object of the invention to provide a motor that incorporates a control loop to maintain the misalignment between rotor and stator field vectors necessary for maximum torquing efficiency.

It is a further object of the invention to provide a drive system for the brushless motor.

It is a still further object of the invention to provide an electronic drive system that permits electronic control over the torque and speed characteristics of the motor.

These and other objects are met by a motor comprising a two phase DC permanent magnet motor, a resolver, and a drive system consisting of a timing circuit, a signal processor, a sampler, and a motor drive amplifier. The resolver is mechanically coupled to the motor shaft and provides an output signal that is a function of the angular position of the shaft. The timing circuit receives this output signal and initiates the sampling action of the sampler. The sampler samples and stores the instantaneous amplitude value of a pair of command signals provided by the signal processor. The command signals are in phase quadrature and the sampling time is phase shifted relative to the command signals according to the angular position of the motor shaft. The motor drive amplifier receives the stored values and applies them to the drive windings in the motor. The drive signals produce a field vector in the stator that is sufficiently misaligned with that produced by the permanent magnet rotor to provide maximum torquing efficiency. The torque generated is proportional to the stored value of the command signals, and the direction of torquing is dependent on the phase of the command signals.

DRAWINGS

PREFERRED EMBODIMENT

Figure 1:
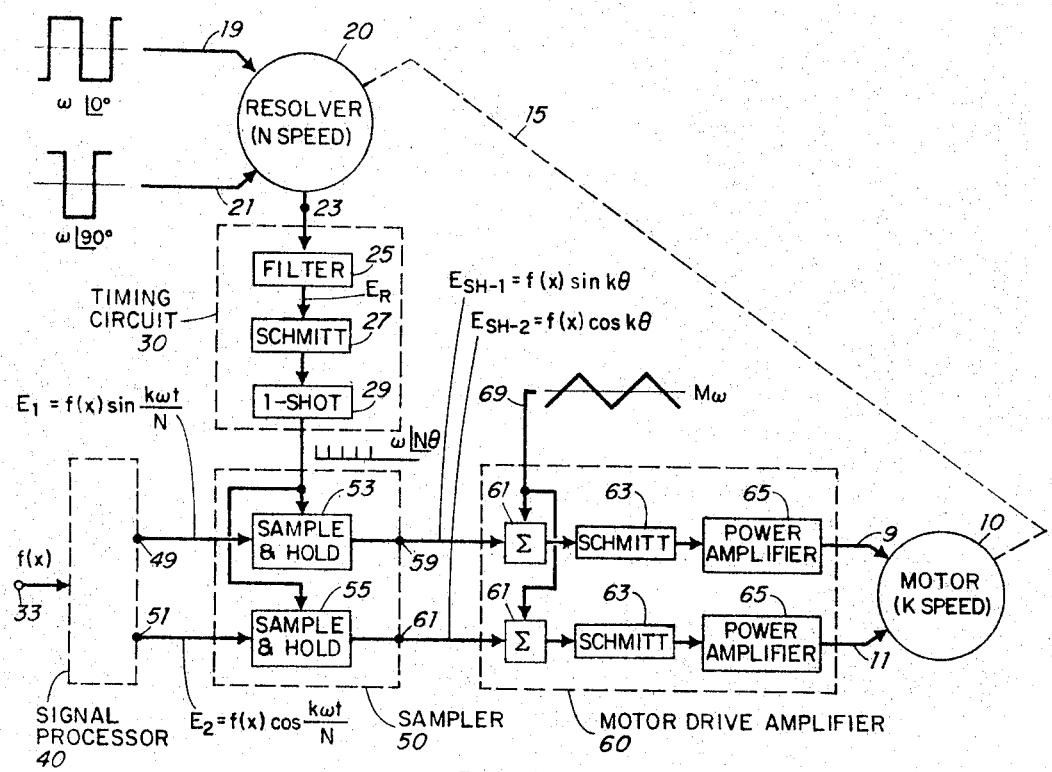
FIG. 1 is a block diagram illustrating the DC brushless motor.

The brushless motor is illustrated in FIG. 1. It comprises DC motor 10, resolver 20, and a drive system composed of timing circuit 30, signal processor 40, sampler 50, and motor drive amplifier 60. Motor 10 has a permanent magnet rotor, K pole pairs (K speed) and a pair of stator drive windings 9 and 11 in spatial quadrature. Resolver 20 has N pole pairs (N speed), a pair of drive windings 19 and 21 in spatial quadrature for receiving drive current in phase quadrature, and output terminal 23. The relationship between the poles of the motor and resolver is such that $K > N$ and $K/N$ is an integer. The resolver produces an output signal whose phase is a function of the angular position $\theta$ of shaft 15.

The rotors of motor 10 and resolver 20 are mechanically coupled by shaft 15. Motor 10 and resolver 20 are mechanically aligned so that in closed loop operation the field vectors of the rotor and stator in the motor are misaligned and torque is continuously produced. Where the alignment of the rotors in the motor and resolver are to be fixed, the relative angle between the stator and rotor fields in the motor is dependent on the angular orientation of the respective stators. Where the stators are in fixed alignment, the relative angle between the rotor and stator fields in the motor is determined by the relative angular position of the rotors in the respective units.

In the motor drive system, sampler 50 is coupled to output terminals 49 and 51 of signal processor 40 and to output terminal 23 of resolver 20 through timing circuit 30. As is later explained, processor 40 supplies to output terminals 49 and 51 command signals in phase quadrature. The commands are sinusoidal signals of frequency $K\omega/N$ that may be unmodulated or modulated by a control function $f(x)$ whereby they conform to the expressions $f(x)$ sin $K\omega t/N$ and $f(x)$ cos $K\omega t/N$. The amplitude value of the commands is sampled and stored at output terminals 59 and 61. Stored values $E_{SH-1}=f(x)$ sin $K\theta$ and $E_{SH-2}=f(x)$ cos $K\theta$ are in phase quadrature. They are coupled to drive windings 9 and 11 of motor 10 by drive amplifier 60 and produce an average field vector in the stator that is sufficiently misaligned with that of the permanent magnet rotor to provide maximum torquing efficiency. The stator field vector rotates as a function of shaft angle $\theta$. The number of electrical rotations of the field is $K\theta$. Developed torque is proportional to the amplitude of control function $f(x)$. Torque direction and, it follows, motor rotation varies according to the sign of $f(x)$.

The sampling time is such that sampler 50 samples the same phase point of each of the command signals when the angular position $\theta$ of shaft 15 is constant. To minimize ripple in sampler 50, the sampling frequency should be maximum or one per cycle of the command signal. However, sampling may be periodic or random providing the same relative phase position of the command signal is sampled when $\theta$ is constant.

For convenience, the sampling instants are synchronized with the zero crossings of the resolver output signal. Timing circuit 30 uses the zero crossings to generate a series of timing pulses to activate sampler 50. Where $K/N$ is odd, only every other zero crossing may be used. On the other hand, when $K/N$ is even, every zero crossing or every other zero crossing may be used to initiate sampling.

The timing circuit of FIG. 1 generates a timing pulse for every other zero crossing of the resolver's output signal. It comprises Schmitt trigger 27 and a one-shot multivibrator 29. These circuits are fully described in Pulse and Digital Circuits, by Millman and Taub, McGraw Hill, 1956. Where terminals 19 and 21 of resolver 20 are energized by a pair of square waves in phase quadrature, filter 25 is employed to pass the fundamental component $E_R=E$ sin $(\omega t + N\theta)$ of the resolver output signal, where $\omega$ is the resolver's excitation frequency. If the resolver is energized by pure sinusoids, it produces signal $E_R$ directly and filter 25 is not required. Schmitt trigger 27 in timing circuit 30 is set with a threshold of zero volts. Consequently, it is activated at each positive zero crossing of signal $E_R$. The leading edge of the output voltage of trigger 27 switches one-shot multivibrator 29 causing it to emit a timing pulse of fixed duration at each positive zero crossing of signal $E_R$. As is next described, these timing pulses energize sample and hold circuits 53 and 55 in sampler 50 so that they sample and store the instantaneous amplitude value of each of the command signal. Thus, the timing pulses and sampling time is phase shifted relative to the command signals by angle $K\theta$.

Figure 2:
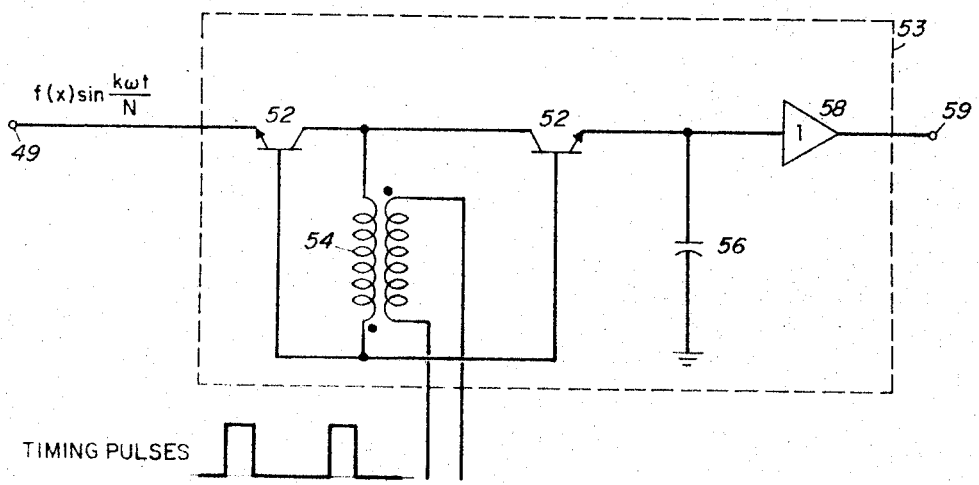
FIG. 2 is a typical sample and hold circuit for the motor of FIG. 1.

A suitable sample and hold circuit is shown in FIG. 2. It is a chopper comprising a pair of transistors 52 and transformer 54 followed by capacitor 56 and high impedance buffer 58, such as a Field Effect Transistor. One chopper is provided for each command signal. The chopper provides a short circuit between its input and output terminals upon the incidence of each timing pulse on transformer 54. The amplitude value of the input signal is then stored at the output terminal. For example, upon receipt of a timing pulse, terminals 49 and 59 are connected and the instantaneous amplitude value $E_{SH-1}$ of command signal $f(x)$ sin $K\omega t/N$ is stored at terminal 59. Such a chopper is manufactured by National Semiconductor Corporation of Danbury, Connecticut as type NS 8000.

Motor drive amplifier 60 may be a DC amplifier of any class. However, to conserve power and reduce drift a preferred amplifier consists of the pulse-width modulator shown in FIG. 1. The modulator has two drive channels one in correspondence with output terminal 59 or 61 of sampler 50. Each comprises summer or adder circuit 61, Schmitt trigger 63, and power amplifier 65. Each summer is coupled to one output terminal of sampler 50 and receives a triangular voltage of frequency $M\omega$ from a voltage source, line 69. A power amplifier 65 is coupled to each of the two windings 9 and 11 of motor 10 and supplies driving current therefor.

The function of the pulse modulator is to produce a series of pulsating voltages whose pulse width is modulated by the stored amplitude value signals $E_{SH-1}$ and $E_{SH-2}$. The pulse width modulated signals are generated by coupling the combined triangular wave and signals $E_{SH-1}$ and $E_{SH-2}$ to Schmitt triggers 63. The trigger levels of the Schmitt circuits are set so that their outputs are square waves with 50 percent duty cycle when the amplitude values at terminals 59 and 61 are zero and only the triangular wave is present. The frequency of these square waves is $M\omega$, where M is any number. As the outputs of the sample and hold circuits take on non-zero values, the duty cycle of the Schmitt triggers change and the percentage of modulation and the average value of each of the drive signals coupled to windings 9 and 11 is proportional to the corresponding stored amplitude value $E_{SH-1}$ or $E_{SH-2}$. One hundred percent modulation is achieved when the amplitude value is the same as that of the triangular wave form. Thus, the stored amplitude values determine the percent modulation in the modulator.

The amplitude of motor torque is proportional to the percent of modulation of the pulsating signals and is therefore proportional to control function $f(x)$ of command signals $E_1$ and $E_2$. Maximum torque occurs when $f(x)$ is equal to the amplitude of the triangular wave. When $f(x)$ is equal to zero no torque is produced. Where the triangular waves incident on summers 61 are generated by more than one source, it is necessary that the waves be in phase or 180 degrees out of phase. Otherwise, a rotating field is induced in motor 10 even though sample-hold outputs are zero and the duty cycle of Schmitt triggers is 50 percent.

Figure 2A:
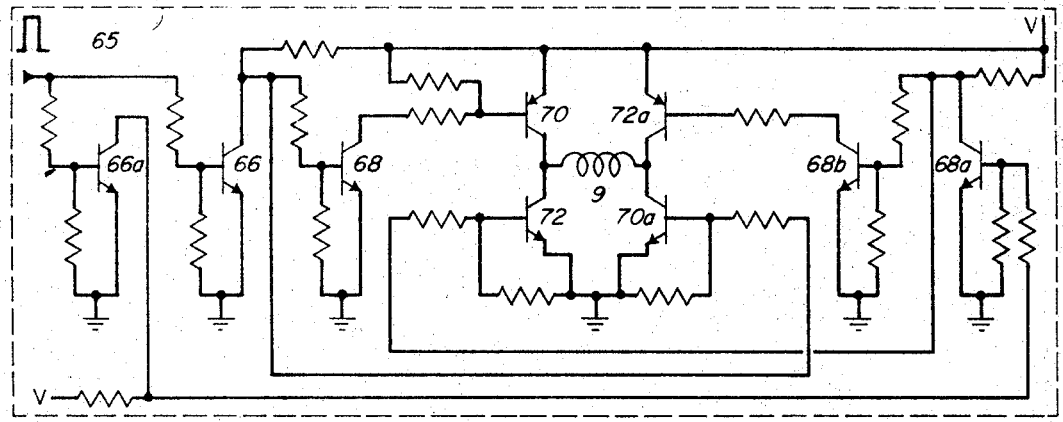
FIG. 2A is a circuit diagram of the power amplifier of FIG. 1.

The direction of motor torquing can be changed by reversing the phase of command signals $E_1$ and $E_2$ by 180 degrees. This reversal is achieved by making the sign of $f(x)$ negative. In this event, stored signals $E_{SH-1}$ and $E_{SH-2}$ of FIG. 1 are each multiplied by $-1$.

Where motor 10 is a four-wire motor (has no common ground) each power amplifier 65 may take the form of the power bridge shown in FIG. 2A. The bridge comprises a pair of amplifiers 66 and 66a coupled in parallel to the corresponding Schmitt trigger output terminal, switches 68, 68a and 68b and paired drivers 72 and 72a that simultaneously operate when the input pulse modulated signal is of positive polarity and paired drivers 70 and 70a that operate when the input modulator signal is of negative polarity or zero value.

The bridge operates as follows. When the modulator input signal is of positive polarity as illustrated in FIG. 2A, amplifiers 66 and 66a emit signals terminating conduction in driver 70a and in switches 68 and 68a. Switch 68 shuts off driver 70 whereas switch 68a simultaneously causes driver 72 to conduct, and, in conjunction with switch 68b, driver 72a to conduct. Drive current then flows from a source of positive voltage V through drivers 72a, 72 and winding 9 to ground potential. The path from source V through drivers 70 and 70a is impeded and thus the current passing through winding 9 is unidirectional. Conversely, when pulse modulated input signal is negative or zero value, by similar action of the amplifiers and switches, drivers 72 and 72a are cut off, drivers 70 and 70a are conducting, and current flows in the opposite direction.

Where motor 10 is of a three-wire variety (one of the terminals is common) similar amplifiers may be devised for producing DC current in winding 9 according to the polarity of the modulated input signal, as is well known in the art. However, such amplifiers may require separate supplies of positive and negative voltage V.

Figure 2B:
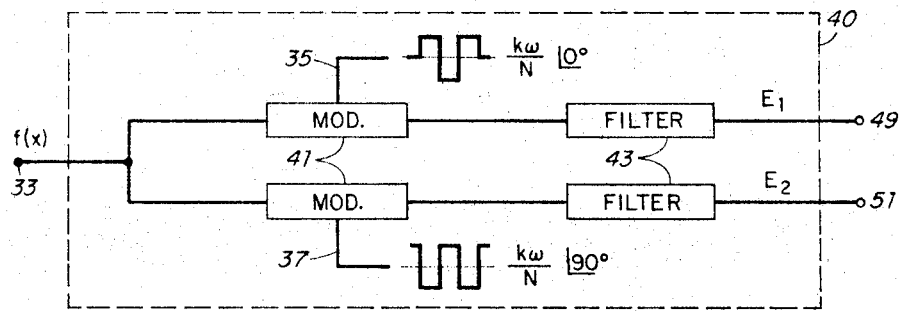
FIG. 2B is a block diagram of a signal processor for the motor of FIG. 1.

As stipulated earlier, the torque developed in motor 10 of FIG. 1 is dependent on the amplitude $f(x)$ and phase command signals $E_1$ and $E_2$. These are provided by signal processor 40 of FIG. 1. As shown more clearly in the block diagram of FIG. 2B, processor 40 comprises a pair of suppressed carrier modulators 41 each coupled to terminal 49 or 51 through band pass filter 43. Modulators 41 receive a pair of reference signals of frequency $K\omega/N$ in phase quadrature from sources 35 and 37. Where the reference signals consist of square waves, filters 43 are required to reject carrier frequency harmonics higher than the first. However, where the reference signals consist of sinusoids in phase quadrature, filters 43 are not required.

Control function $f(x)$, appearing at input terminal 33, is coupled to both modulators 41 and modulates the reference signal. Control function $f(x)$ can be a constant or any function (i.e., linear, nonlinear, sinusoidal) and take on both positive and negative values all depending on the magnitude and direction of the desired torque. Where constant torquing is desired the control function is a constant.

Figure 2C:
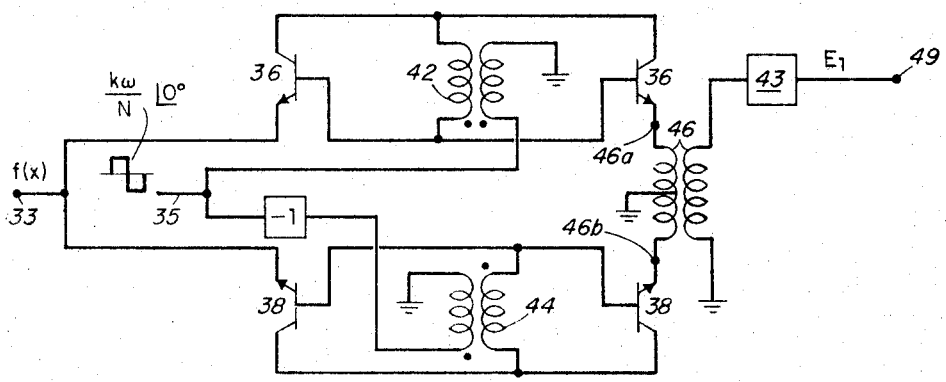
FIG. 2C is a circuit diagram of the modulator of FIG. 2B.

Each suppressed carrier modulator 41 may be a Ring Modulator (sinusoidal reference) or a parallel pair of electronic choppers as described in conjunction with FIG. 2 followed by a center tapped transformer. The use of choppers is illustrated in FIG. 2C in the context of the modulation between terminals 33 and 49 of FIGS. 1 and 2B. Illustrated in FIG. 2C is a parallel pair of electronic choppers as previously described followed by center tapped transformer 46. Upon receipt of the square wave reference signal with zero phase shift from source 35, transformer 42 causes transistors 36 to conduct thereby coupling control function $f(x)$ to terminal 46a of transformer 46. Due to the $-1$ phase reversal of the reference signal, transistors 38 remain nonconducting and alternate transformer terminal 46b is disconnected from terminal 33. Conversely, when the square wave reference signal goes negative, the operation of transformer 44 causes transistors 38 to conduct and couples $f(x)$ to transformer terminal 46b. Operation of transformer 42, on the other hand, impedes current flow in transistors 36 and transformer terminal 46a is disconnected from terminal 33.

By continuous operation of the parallel choppers, a suppressed carrier modulated signal develops across the secondary of transformer 46, and upon being filtered by filter 43, produces command $E_1$ at terminal 49. An identical chopper arrangement is provided for modulating the quadrature reference signal received from source 37 and used for developing the second command signal $E_2$.

While there has been shown and described what is considered to be the preferred embodiment of the present invention, it will be obvious to those skilled in the art that various changes and modifications may be made therein without departing from the invention as defined in the appended claims.

What is claimed is:

1. A drive system for a DC brushless motor incorporating a DC motor having K pole pairs, first and second drive windings in spatial quadrature and a shaft whose angular position is $\theta$ and further incorporating a resolver having N pole pairs wherein $K/N$ is an integer and $K>N$, and an output terminal having an output signal with a sinusoidal component that has zero crossings whose phase is a function of $\theta$, said resolver being mechanically coupled to said motor, said drive system comprising:
   (A) a signal processor having first and second output terminals, said processor supplying first and second command signals in phase quadrature to said first and second output terminals, respectively,
   (B) a sampler having first, second and third input terminals, and first and second output terminals, said first and second input terminals coupled to said first and second output terminals of said processor, respectively, said sampler sampling the instantaneous amplitude value of said first and second command signals and storing said values at said first and second output terminals respectively of said sampler, said sampling synchronized so that it occurs at the same relative phase position of said commands when $\theta$ is constant,
   (C) first means coupling said output terminal of said resolver to said third input terminal of said sampler, and
   (D) second means coupling said first and second output terminals of said sampler to said first and second windings of said motor, respectively.

2. A drive system as defined in claim 1 wherein:
   (a) said first coupling means comprises a timing circuit producing a series of timing pulses that initiate said sampling in said sampler, said timing pulses synchronized with the phase of said output signal of said resolver, and
   (b) wherein said second coupling means comprises a motor drive amplifier.

3. A drive system as defined in claim 2 wherein:
   (c) said output signal component of said resolver conforming with the expression $E \sin(\omega t + N\theta)$, and
   (d) said signal processor comprises a modulator modulating a pair of reference signals of frequency $K\omega/N$ in phase quadrature with control function $f(x)$ to produce said first command signal of the form $f(x) \sin K\omega t/N$ and said second command signal of the form $f(x) \cos K\omega t/N$.

4. A drive system as defined in claim 3 wherein:
   (e) $K/N$ is odd and said timing pulses are synchronized with every of said zero crossings of said sinusoidal output of said resolver.

5. A drive system as defined in claim 3 wherein:
   (e) $K/N$ is even and said timing pulses are synchronized with every other of said zero crossings of said sinusoidal output of said resolver.

6. A drive system for a DC brushless motor as set forth in claim 3 wherein said second coupling means comprises:
   (e) a source of triangular voltage of frequency $M\omega$, and
   (f) first and second drive channels including a summer coupled to said source of triangular voltage and to the correspondingly numbered output terminal of said sampler, a power amplifier coupled to the correspondingly numbered winding of said motor and a Schmitt trigger intercoupling said summer and said pulse amplifier, said Schmitt trigger producing pulsating drive signals whose average value is proportional to said stored value of said correspondingly numbered sample command signal.

7. A DC brushless motor comprising:
   (A) a DC motor having first and second windings in spatial quadrature, K pole pairs, and a rotor shaft whose angular position is $\theta$,
   (B) a resolver coupled to said shaft, said resolver having N pole pairs where $K/N$ is an integer and $K>N$, and an output terminal having an output signal with a component of the form $E \sin(\omega t + N\theta)$ that has zero crossings,
   (C) a signal processor having first and second output terminals, said processor supplying first and second command signals in phase quadrature to said first and second output terminals, respectively,
   (D) a sampler having first, second, and third input terminals, and first and second output terminals, said first and second input terminals coupled to said first and second output terminals of said processor, respectively, said sampler sampling the instantaneous amplitude value of said first and second command signals, and storing said values at said first and second output terminals, respectively, of said sampler, said sampling synchronized so that it occurs at the same relative phase position of said commands when $\theta$ is constant, (E) first means coupling said output terminal of said resolver to said third input terminal of said sampler, and (F) second means coupling said first and second output terminals of said sampler to said first and second windings of said motor, respectively.

8. A DC brushless motor as defined in claim 7 wherein:

(a) said first coupling means comprises a timing circuit producing a series of timing pulses that initiate said sampling in said sampler, said timing pulses synchronzed with the phase of said output signal component of said resolver, and (b) wherein said second means comprises a motor drive amplifier.

9. A DC brushless motor as defined in claim 8 wherein:

(c) said signal processor comprises a modulator modulating a pair of reference signals of frequency $K\omega/N$ in phase quadrature with control function $f(x)$ to produce said first command signal of the form $f(x) \sin K\omega t/N$ and said second command signal of the form $f(x) \cos K\omega t/N$.

10. The DC brushless motor of claim 9 wherein:

(d) $K/N$ is odd and said timing pulses are synchronized with every other of said zero crossings of said output component of said resolver.

11. The DC brushless motor of claim 9 wherein:

(d) $K/N$ is even and said timing pulses are synchronized with every of said zero crossings of said output component of said resolver.

References Cited

UNITED STATES PATENTS

| | | | |
|---|---|---|---|
| 3,305,713 | 2/1967 | Ikegami | 318—138 |
| 3,383,574 | 5/1968 | Manteuffel | 318—254 XR |

B. DOBECK, Primary Examiner

G. R. SIMMONS, Assistant Examiner

U.S. Cl. X.R.

318—254